(12) United States Patent
Parikh et al.

(10) Patent No.: US 9,800,673 B2
(45) Date of Patent: Oct. 24, 2017

(54) SERVICE COMPILER COMPONENT AND SERVICE CONTROLLER FOR OPEN SYSTEMS INTERCONNECTION LAYER 4 THROUGH LAYER 7 SERVICES IN A CLOUD COMPUTING SYSTEM

(71) Applicant: AT&T Intellectual Property I, L.P., Atlanta, GA (US)

(72) Inventors: Anisa Parikh, Holmdel, NJ (US); Neela R. Atluri, Marlboro, NJ (US); Paritosh Bajpay, Edison, NJ (US); Sekar Ganesan, Ocean, NJ (US); Shobhna Goyal, Marlboro, NJ (US); Shiv Kumar, Marlboro, NJ (US); Magda K. Nassar, Tinton Falls, NJ (US); Satyendra Tripathi, E Brunswick, NJ (US); Ralph Utano, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/464,283

(22) Filed: Aug. 20, 2014

(65) Prior Publication Data
US 2016/0057234 A1 Feb. 25, 2016

(51) Int. Cl.
*H04L 29/08* (2006.01)
*G06F 9/445* (2006.01)
*G06F 9/455* (2006.01)

(52) U.S. Cl.
CPC ............ *H04L 67/16* (2013.01); *G06F 8/65* (2013.01); *G06F 9/45558* (2013.01); *G06F 2009/45595* (2013.01); *H04L 67/10* (2013.01)

(58) Field of Classification Search
CPC .............. G06F 8/40–8/49; G06F 8/60–8/71
See application file for complete search history.

(56) References Cited

U.S. PATENT DOCUMENTS

| 7,466,710 B1 | 12/2008 | Clemm et al. |
| 7,574,496 B2 | 8/2009 | Mccrory et al. |
| 7,603,671 B2 | 10/2009 | Liu |
| 7,818,002 B2 | 10/2010 | Bajko et al. |
| 7,869,364 B2 | 1/2011 | Griffith et al. |
| 8,032,413 B2 | 10/2011 | Carlson |
| 8,190,740 B2 | 5/2012 | Stienhans et al. |

(Continued)

OTHER PUBLICATIONS

Binz, Tobias, et al. "Portable Cloud Services Using TOSCA." IEEE Internet Computing 16.3 (2012).

(Continued)

*Primary Examiner* — Matthew Brophy
(74) *Attorney, Agent, or Firm* — Hartman & Citrin LLC

(57) ABSTRACT

Concepts and technologies disclosed herein are directed to a service compiler component and service controller for Open Systems Interconnection ("OSI") communication model layer 4 through layer 7 services in a cloud computing system. According to one aspect of the concepts and technologies disclosed herein, the service compiler component can receive compiler data associated with a new service. The service compiler component also can analyze the compiler data at least to determine at least one virtual network function ("VNF") to be used to instantiate the new service. The service compiler also can generate a template for the new service.

18 Claims, 8 Drawing Sheets

(56) References Cited

U.S. PATENT DOCUMENTS

| | | | |
|---|---|---|---|
| 8,209,415 B2 | 6/2012 | Wei | |
| 8,218,557 B2 | 7/2012 | Kean et al. | |
| 8,244,559 B2 | 8/2012 | Horvitz et al. | |
| 8,250,215 B2 | 8/2012 | Stienhans et al. | |
| 8,271,653 B2 | 9/2012 | Dehaan | |
| 8,276,140 B1 | 9/2012 | Beda et al. | |
| 8,433,802 B2 | 4/2013 | Head et al. | |
| 8,514,868 B2 | 8/2013 | Hill | |
| 8,515,433 B2 | 8/2013 | Vaswani et al. | |
| 8,572,612 B2 | 10/2013 | Kern | |
| 8,606,878 B2 | 12/2013 | Ferris | |
| 8,615,745 B2* | 12/2013 | Blainey | G06F 8/443 717/140 |
| 8,615,746 B2* | 12/2013 | Blainey et al. | 717/140 |
| 8,656,019 B2 | 2/2014 | Chikando et al. | |
| 8,700,946 B2 | 4/2014 | Reddy et al. | |
| 8,724,620 B2 | 5/2014 | Ku et al. | |
| 8,739,157 B2 | 5/2014 | Ho et al. | |
| 8,832,669 B2* | 9/2014 | Blainey | G06F 8/443 717/140 |
| 8,959,484 B2* | 2/2015 | Pinnix | 717/124 |
| 9,621,428 B1* | 4/2017 | Lev | H04L 41/12 |
| 2005/0027870 A1* | 2/2005 | Trebes, Jr. | H04B 1/715 709/227 |
| 2005/0176428 A1 | 8/2005 | Gabor et al. | |
| 2006/0146792 A1 | 7/2006 | Ramachandran | |
| 2007/0036151 A1 | 2/2007 | Baeder | |
| 2007/0106769 A1 | 5/2007 | Liu | |
| 2008/0025221 A1 | 1/2008 | Lipps | |
| 2008/0112411 A1 | 5/2008 | Stafford et al. | |
| 2008/0209007 A1 | 8/2008 | Gurecki et al. | |
| 2008/0215736 A1 | 9/2008 | Astrom et al. | |
| 2008/0254795 A1 | 10/2008 | Ratcliffe | |
| 2009/0067409 A1 | 3/2009 | Ku | |
| 2009/0097398 A1 | 4/2009 | Belinchon Vergara et al. | |
| 2009/0116505 A1 | 5/2009 | Bhatia et al. | |
| 2009/0300210 A1 | 12/2009 | Ferris | |
| 2010/0136970 A1 | 6/2010 | Mui et al. | |
| 2010/0274680 A1 | 10/2010 | Carlson | |
| 2010/0296443 A1 | 11/2010 | Hirano et al. | |
| 2011/0093584 A1 | 4/2011 | Qiu et al. | |
| 2011/0117888 A1 | 5/2011 | Klein et al. | |
| 2011/0119312 A1* | 5/2011 | Chopra et al. | 707/802 |
| 2011/0119729 A1 | 5/2011 | Bergeson et al. | |
| 2011/0126168 A1 | 5/2011 | Ilyayev | |
| 2011/0145836 A1 | 6/2011 | Wheeler et al. | |
| 2011/0252420 A1 | 10/2011 | Tung et al. | |
| 2011/0295996 A1 | 12/2011 | Qiu et al. | |
| 2012/0011077 A1 | 1/2012 | Bhagat | |
| 2012/0030331 A1 | 2/2012 | Karampatsis | |
| 2012/0072581 A1 | 3/2012 | Tung et al. | |
| 2012/0096045 A1 | 4/2012 | Moore et al. | |
| 2012/0102183 A1 | 4/2012 | Murakami et al. | |
| 2012/0124211 A1 | 5/2012 | Kampas et al. | |
| 2012/0131591 A1 | 5/2012 | Moorthi et al. | |
| 2012/0158921 A1 | 6/2012 | Asveren et al. | |
| 2012/0203823 A1 | 8/2012 | Manglik et al. | |
| 2012/0281706 A1 | 11/2012 | Agarwal et al. | |
| 2012/0297059 A1 | 11/2012 | Bross | |
| 2012/0300615 A1 | 11/2012 | Kempf et al. | |
| 2012/0311154 A1 | 12/2012 | Morgan | |
| 2013/0031550 A1 | 1/2013 | Choudhury et al. | |
| 2013/0054670 A1 | 2/2013 | Keyes | |
| 2013/0091284 A1 | 4/2013 | Rothschild | |
| 2013/0091285 A1 | 4/2013 | Devarakonda et al. | |
| 2013/0124401 A1 | 5/2013 | Del | |
| 2013/0124712 A1 | 5/2013 | Parker | |
| 2013/0145367 A1 | 6/2013 | Moss et al. | |
| 2013/0182702 A1 | 7/2013 | Ku | |
| 2013/0188489 A1 | 7/2013 | Sato | |
| 2013/0227673 A1 | 8/2013 | Yoon | |
| 2013/0268913 A1 | 10/2013 | Anderson et al. | |
| 2013/0286861 A1 | 10/2013 | Smith et al. | |
| 2013/0291052 A1 | 10/2013 | Hadar et al. | |
| 2013/0303114 A1 | 11/2013 | Ahmad et al. | |
| 2013/0304904 A1 | 11/2013 | Mouline et al. | |
| 2013/0311778 A1 | 11/2013 | Cherukuri et al. | |
| 2013/0326036 A1 | 12/2013 | Heumesser et al. | |
| 2013/0344897 A1 | 12/2013 | Pierce, II et al. | |
| 2014/0010084 A1 | 1/2014 | Kavunder et al. | |
| 2014/0032850 A1 | 1/2014 | Phelan et al. | |
| 2014/0033268 A1* | 1/2014 | Julisch et al. | 726/1 |
| 2014/0059226 A1 | 2/2014 | Messerli et al. | |
| 2014/0068611 A1 | 3/2014 | McGrath et al. | |
| 2014/0068703 A1 | 3/2014 | Bzlus et al. | |
| 2014/0074973 A1 | 3/2014 | Kumar et al. | |
| 2014/0082699 A1 | 3/2014 | Eicken et al. | |
| 2014/0086177 A1 | 3/2014 | Adjakple et al. | |
| 2014/0109188 A1 | 4/2014 | Pavlov et al. | |
| 2014/0112139 A1 | 4/2014 | Allan et al. | |
| 2014/0115578 A1 | 4/2014 | Cooper et al. | |
| 2014/0115583 A1 | 4/2014 | Lee et al. | |
| 2014/0123129 A1* | 5/2014 | Risbood et al. | 717/176 |
| 2014/0130038 A1* | 5/2014 | Lucovsky et al. | 717/176 |
| 2014/0146673 A1 | 5/2014 | Parker | |
| 2014/0149485 A1 | 5/2014 | Sharma et al. | |
| 2014/0149492 A1 | 5/2014 | Ananthanarayanan et al. | |
| 2014/0156850 A1 | 6/2014 | Hunt | |
| 2014/0189109 A1 | 7/2014 | Jang | |
| 2014/0201374 A1 | 7/2014 | Ashwood-Smith | |
| 2014/0279201 A1* | 9/2014 | Iyoob et al. | 705/26.7 |
| 2014/0280848 A1* | 9/2014 | Modh et al. | 709/223 |
| 2014/0280918 A1* | 9/2014 | Grandhe et al. | 709/224 |
| 2014/0280964 A1* | 9/2014 | Farooq et al. | 709/226 |
| 2014/0280966 A1* | 9/2014 | Sapuram et al. | 709/226 |
| 2014/0282037 A1* | 9/2014 | Narasimhan et al. | 715/738 |
| 2014/0282525 A1* | 9/2014 | Sapuram et al. | 718/1 |
| 2014/0282536 A1* | 9/2014 | Dave et al. | 718/1 |
| 2014/0317166 A1* | 10/2014 | Iyoob et al. | 709/201 |
| 2014/0317293 A1 | 10/2014 | Shatzkamer | |
| 2015/0007169 A1* | 1/2015 | Li et al. | 717/177 |
| 2015/0033365 A1* | 1/2015 | Mellor et al. | 726/29 |
| 2015/0063166 A1* | 3/2015 | Sif | G06F 9/45558 370/254 |
| 2015/0120890 A1 | 4/2015 | Ghai | |
| 2015/0142958 A1 | 5/2015 | Tamura | |
| 2015/0149611 A1 | 5/2015 | Lissack | |
| 2015/0180730 A1* | 6/2015 | Felstaine | H04L 41/022 709/225 |
| 2015/0180948 A1 | 6/2015 | Shao | |
| 2015/0295750 A1* | 10/2015 | Blanco | G06F 11/181 714/4.2 |
| 2015/0326535 A1 | 11/2015 | Rao et al. | |
| 2015/0347264 A1 | 12/2015 | Mohammed | |
| 2015/0347759 A1 | 12/2015 | Cabrera | |
| 2015/0358248 A1* | 12/2015 | Saha | H04L 43/0817 709/226 |
| 2015/0363423 A1 | 12/2015 | Utgikar | |
| 2015/0378703 A1* | 12/2015 | Govindaraju | G06F 8/60 717/174 |
| 2016/0013985 A1 | 1/2016 | Reddy et al. | |
| 2016/0028434 A1 | 1/2016 | Kerpez et al. | |
| 2016/0036835 A1 | 2/2016 | Lietz | |
| 2016/0036983 A1 | 2/2016 | Korolev et al. | |
| 2016/0047566 A1 | 2/2016 | Haga et al. | |
| 2016/0062746 A1* | 3/2016 | Chiosi | G06F 8/35 717/104 |
| 2016/0080496 A1 | 3/2016 | Falanga et al. | |
| 2016/0112875 A1 | 4/2016 | Kasravi et al. | |
| 2016/0188877 A1* | 6/2016 | Simha | G06F 21/552 726/22 |
| 2016/0216994 A1 | 7/2016 | Sefidcon et al. | |
| 2016/0241446 A1 | 8/2016 | Gupte et al. | |

OTHER PUBLICATIONS

Somorovsky, Juraj, et al. "All your clouds are belong to us: security analysis of cloud management interfaces." Proceedings of the 3rd ACM workshop on Cloud computing security workshop. ACM, 2011.

Xu, Cheng-Zhong, Jia Rao, and Xiangping Bu. "URL: A unified reinforcement learning approach for autonomic cloud manage-

(56) References Cited

OTHER PUBLICATIONS ment." Journal of Parallel and Distributed Computing 72.2 (2012): 95-105.
Rochwerger, Benny, et al. "Reservoir—when one cloud is not enough." IEEE computer 44.3 (2011): 44-51.
Sotomayor, Borja, et al. "Virtual infrastructure management in private and hybrid clouds." Internet Computing, IEEE 13.5 (2009): 14-22.
Harmer, Terence, et al. "An application-centric model for cloud management." Services (Services-1), 2010 6th World Congress on. IEEE, 2010.
Stanek, Jan, Lukas Kencl, and Jiri Kuthan. "Characteristics of real open SIP-Server traffic." Passive and Active Measurement. Springer Berlin Heidelberg, 2013.
Kim, Jong Yul, and Henning Schulzrinne. "SipCloud: dynamically scalable SIP proxies in the cloud." Proceedings of the 5th International Conference on Principles, Systems and Applications of IP Telecommunications. ACM, 2011.
Scholler, Marcus, et al. "Resilient deployment of virtual network functions." Ultra Modern Telecommunications and Control Systems and Workshops (ICUMT), 2013 5th International Congress on. IEEE, 2013.
"Network Functions Virtualisation (NFV); Use Cases", ETSI, Oct. 2013.
"Virtualizing Network Services—the Telecom Cloud", Ericsson, Mar. 28, 2014.
"The Role of Layer 4-7 Services in Scaling Applications for the Cloud-Computing Data Center", Cisco, 2011.
Kächele, Steffen, et al. "Beyond IaaS and PaaS: An extended cloud taxonomy for computation, storage and networking." Proceedings of the 2013 IEEE/ACM 6th International Conference on Utility and Cloud Computing. IEEE Computer Society, 2013.
Ravindran, Ravishankar, et al. "Towards software defined ICN based edge-cloud services." Cloud Networking (CloudNet), 2013 IEEE 2nd International Conference on. IEEE, 2013.
"Software Defined Network and Network Functions Virtualization", Vikram Nair, 2014.
Manzalini, Antonio, and Roberto Saracco. "Software Networks at the Edge: A Shift of Paradigm." Future Networks and Services (SDN4FNS), IEEE, 2013.
Manzalini, Antonio, et al. "Clouds of virtual machines in edge networks."Communications Magazine, IEEE 51.7 (2013).
"The Real-Time Cloud", Ericsson, Feb. 2014.
U.S. Office Action dated Apr. 6, 2016 in U.S. Appl. No. 14/464,222.
U.S. Office Action dated May 18, 2016 in U.S. Appl. No. 14/464,261.
Basilier et al., "Virtualizing network services—the telecom cloud," Ericsson Review, Mar. 28, 2014, Ericsson.
White paper from ONUG Board of Directors, "Open Networking Challenges and Opportunities," Jul. 2014.
U.S. Office Action dated Feb. 18, 2016 in U.S. Appl. No. 14/464,241.
Office Action dated Apr. 20, 2017, in U.S. Appl. No. 14/464,222.
U.S. Office Action dated Oct. 20, 2016 in U.S. Appl. No. 14/464,212.
U.S. Office Action dated Nov. 2, 2016 in U.S. Appl. No. 14/464,222.
U.S. Office Action dated Jan. 12, 2017 in U.S. Appl. No. 14/464,261.
U.S. Office Action dated Oct. 20, 2016 in U.S. Appl. No. 14/464,254.

* cited by examiner

SERVICE COMPILER COMPONENT AND
SERVICE CONTROLLER FOR OPEN
SYSTEMS INTERCONNECTION LAYER 4
THROUGH LAYER 7 SERVICES IN A
CLOUD COMPUTING SYSTEM

BACKGROUND

Today, services are typically developed from multiple sets of requirements and then integrated. After integration and testing are complete, the service is deployed manually into one or more sites. The sites may be either a central office or a data center. This process is time consuming and error prone.

SUMMARY

Concepts and technologies disclosed herein are directed to a service compiler component and service controller for Open Systems Interconnection ("OSI") communication model layer 4 through layer 7 services in a cloud computing system. According to one aspect of the concepts and technologies disclosed herein, the service compiler component can receive compiler data associated with a new service. The service compiler component also can analyze the compiler data at least to determine at least one virtual network function ("VNF") to be used to instantiate the new service. The service compiler component also can generate a template for the new service.

In some embodiments, the compiler data can include a service data model file. The service compiler component can analyze the service data model file to determine the VNF to be used to instantiate the new service.

In some embodiments, the compiler data can include a business policy and an engineering rule. The service compiler component can analyze the business policy and the engineering rule to define a constraint for the new service.

In some embodiments, the compiler data can include a service recipe. The service compiler component can analyze the service recipe to determine at least one script that is used for deployment of the new service.

In some embodiments, the compiler data can include a configuration parameter. The service compiler component can analyze the configuration parameter to determine how to configure the new service.

In some embodiments, the compiler data can include a dimensioning parameter. The service compiler component can analyze the dimensioning parameter to determine a plurality of virtual resources to be utilized for deployment of the new service.

In some embodiments, the service compiler component can cause the template for the new service to be stored in a template database. The service compiler component also can provide the template to an orchestration and controller component which utilizes the template to instantiate the service.

According to another aspect of the concepts and technologies disclosed herein, a service controller can include a service compiler component. The service compiler component can be executed by at least one of a plurality of hardware resources to perform operations. The service compiler component can receive compiler data associated with a new service. The service compiler component can analyze the compiler data at least to determine a plurality of VNFs to be used to instantiate the new service. The service compiler component can generate a template for the new service. The service controller also can include an orchestration and controller component. The orchestration and controller component can be executed by at least one of the plurality of hardware resources to perform operations. The orchestration and controller component can receive the template for the new service. The orchestration and controller component also can request a resource orchestrator to create the plurality of virtual network functions in accordance with the template. The orchestration and controller component also can alert a VNF controller to the plurality of the VNFs created by the resource orchestrator. The service controller also can include the VNF controller. The VNF controller can be executed by at least one of the plurality of hardware resources to perform operations. The VNF controller can interact with a VNF adapter to configure and manage the plurality of VNFs.

In some embodiments, the compiler data can include a service data model file. The service compiler can analyze the service data model file to determine the plurality of VNFs to be used to instantiate the new service.

In some embodiments, the compiler data can include a business policy and an engineering rule. The service compiler can analyze the business policy and the engineering rule to define a constraint for the new service.

In some embodiments, the compiler data can include a service recipe. The service compiler can analyze the service recipe to determine at least one script that is used for deployment of the new service.

In some embodiments, the compiler data can include a configuration parameter. The service compiler can analyze the configuration parameter to determine how to configure the new service.

In some embodiments, the compiler data can include a dimensioning parameter. The service compiler can analyze the dimensioning parameter to determine a plurality of virtual resources to be utilized for deployment of the new service.

In some embodiments, the service compiler can cause the template for the new service to be stored in a template database. The service compiler also can provide the template to an orchestration and controller component which utilizes the template to instantiate the service.

In some embodiments, the service controller also can include a policy management and service management decision engine ("PSMDE"). The PSMDE can be executed by at least one of the plurality of hardware resources to perform operations associated with traffic forecasting and elasticity management.

In some embodiments, the VNF controller can collect data related to at least one of fault, capacity, accounting, performance, or security from the plurality of VNFs. The VNF controller also can send the data to a service data collection and analytics engine ("SDCAE").

In some embodiments, the service controller also can include the SDCAE. The SDCAE can be executed by at least one of the plurality of hardware resources to perform operations. The SDCAE can utilize at least one policy and the data received from the service data collection and analytics engine to determine if a topology of the new service should be modified. The SDCAE can, in response to determining the topology of the new service should be modified, instruct the service configuration component regarding a modification to the new service.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
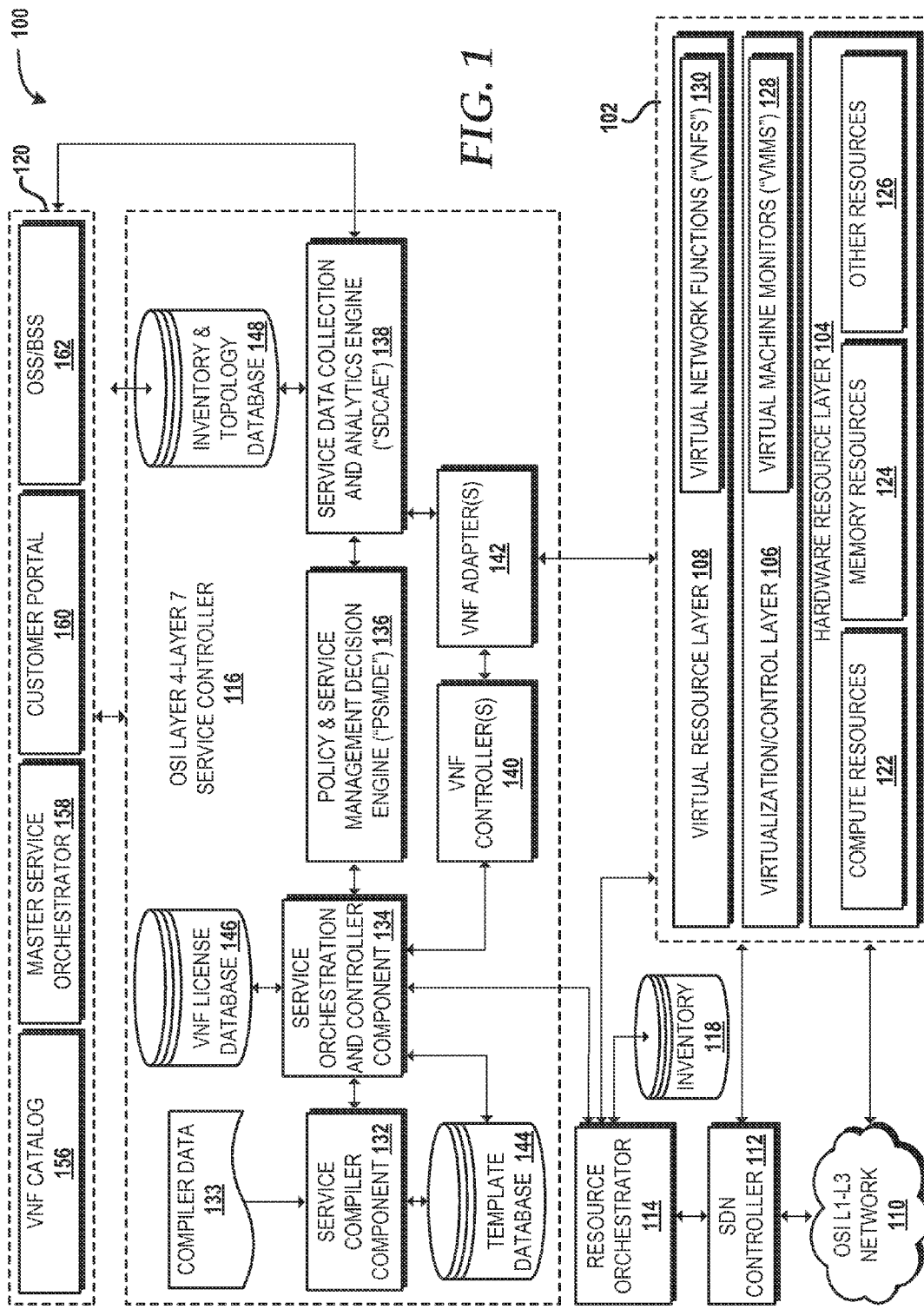
FIG. 1 is a block diagram illustrating aspects of an illustrative operating system for implementing the various concepts and technologies disclosed herein.

Referring now to FIG. 1, aspects of an illustrative operating system 100 for implementing various embodiments of the concepts and technologies disclosed herein will be described. The illustrated operating system 100 includes a cloud computing architecture 102 that, in turn, includes a hardware resource layer 104, a virtualization/control layer 106, and a virtual resource layer 108. The illustrated cloud computing architecture 102 is in communication with an Open Systems Interconnection ("OSI") communication model layer 1-3 network 110 (hereinafter "OSI L1-L3 network 110"), a software-defined network ("SDN") controller 112, a resource orchestrator 114, and an OSI layer 4-7 service controller 116 (hereinafter "OSI L4-L7 service controller 116"). The illustrated resource orchestrator 114 is in communication with a resource inventory component 118 (hereinafter "inventory 118"). The illustrated OSI L4-L7 service controller 116 is in communication with service provider systems 120.

The hardware resources layer 104 provides hardware resources, which, in the illustrated embodiment, include one or more compute resource(s) 122, one or more memory resource(s) 124, and one or more other resources 126. The compute resource(s) 122 can include one or more hardware components that perform computations to process data, and/or to execute computer-executable instructions of one or more application programs, operating systems, and/or other software. The compute resource(s) 122 can include one or more central processing units ("CPUs") configured with one or more processing cores. The compute resource(s) 122 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resource(s) 122 can include one or more discrete GPUs. In some other embodiments, the compute resource(s) 122 can include CPU and GPU components that are configured in accordance with a co-processing CPU/GPU computing model, wherein the sequential part of an application executes on the CPU and the computationally-intensive part is accelerated by the GPU. The compute resource(s) 122 can include one or more system-on-chip ("SoC") components along with one or more other components, including, for example, one or more of the memory resource(s) 124, and/or one or more of the other resources 126. In some embodiments, the compute resource(s) 122 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resource(s) 122 can be or can include one or more hardware components architected in accordance with an ARM architecture, available for license from ARM HOLDINGS of Cambridge, United Kingdom. Alternatively, the compute resource(s) 122 can be or can include one or more hardware components architected in accordance with an x86 architecture, such an architecture available from INTEL CORPORATION of Mountain View, Calif., and others. Those skilled in the art will appreciate the implementation of the compute resource(s) 122 can utilize various computation architectures, and as such, the compute resource(s) 122 should not be construed as being limited to any particular computation architecture or combination of computation architectures, including those explicitly disclosed herein.

The memory resource(s) 124 can include one or more hardware components that perform storage operations, including temporary or permanent storage operations. In some embodiments, the memory resource(s) 124 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resource(s) 122.

The other resource(s) 126 can include any other hardware resources that can be utilized by the compute resources(s) 122 and/or the memory resource(s) 124 to perform operations described herein.

The hardware resources operating within the hardware resources layer 104 can be virtualized by one or more virtual machine monitors ("VMMs") 128 (also known as "hypervisors") operating within the virtualization/control layer 106 to create one or more virtual resources that reside in the virtual resource layer 108. The VMMs 128 can be or can include software, firmware, and/or hardware that alone or in combination with other software, firmware, and/or hardware, creates one or more virtual resources operating within the virtual resource layer 108.

The virtual resources operating within the virtual resource layer 108 can include abstractions of at least a portion of the compute resource(s) 122, the memory resource(s) 124, and/or the other resources 126, or any combination thereof. In the illustrated embodiment, the virtual resource layer 108 includes special-purpose virtual machines referred to herein as virtual network functions ("VNFs") 130. The VNFs 130 can be virtualizations of any network functions that perform, at least in part, one or more operations to support one or more OSI layer 4-7 services.

Layer 4 of the OSI communication model, also known as the Transport Layer, ensures end-to-end delivery of messages for both "connection-mode" data such as transfer control protocol ("TCP") connections and "connectionless-mode" data such as user datagram protocol ("UDP") datagrams. For both modes, the endpoints of communication are identified by port numbers such as TCP port 80 or UDP port 161. Additional details regarding the Transport Layer are known to those skilled in the art, and as such, further explanation is not provided herein.

Layer 5 of the OSI communication model, also known as the Session Layer, provides services for coordinating communication between applications and synchronizing message delivery. For example, a protocol with suspend and resume or checkpoint and rollback capabilities includes session layer services such as, for example, International Telecommunication Union ("ITU") X.225, APPLETALK available from APPLE INC., and remote procedure call ("RPC"). Additional details regarding the Session Layer are known to those skilled in the art, and as such, further explanation is not provided herein.

Layer 6 of the OSI communication model, also known as the Presentation Layer, provides services for converting data from local format (i.e., abstract syntax) into a machine-independent format (i.e., transfer syntax). Some application protocols are defined in Abstract Syntax Notation One ("ASN.1") notation. ASN. 1 defines a set of data structures mapped to encoding rules—for example, how an Integer should be encoded into a bit string to be transmitted to and decoded by a recipient using XML Encoding Rules (XER). Additional details regarding the Presentation Layer are known to those skilled in the art, and as such, further explanation is not provided herein.

Layer 7 of the OSI communication model, also known as the Application Layer, provides common services used by applications to establish, release, and abort communication with each other, as well as specific services. Most applications function within the Application Layer. Additional details regarding the Application Layer are known to those skilled in the art, and as such, further explanation is not provided herein.

The OSI L1-L3 network 110 can include layer 1 through layer 3 of the OSI communication model. Layer 1 through layer 3 of the OSI communication model will be briefly described below. Additional details regarding layer 1 through layer 3 of the OSI communication model are provided below.

Layer 1 of the OSI communication model, also known as the Physical Layer, provides a physical media over which unstructured raw bit stream can be transmitted and received. The Physical Layer describes the electrical, optical, mechanical, and functional interfaces to the physical medium. The Physical Layer also carries signal for layers 2-7 of the OSI communication model. The Physical Layer provides data encoding.

Layer 2 of the OSI communication model, also known as the Data Link layer, provides for the transfer of data from one node to another via the physical layer. The Data Link Layer provides link establishment and termination, frame traffic control, frame sequencing, frame acknowledgement, frame delimiting, frame error checking, and media access management.

Layer 3 of the OSI communication model, also known as the Network Layer, controls the operation of the subnet, deciding which physical path the data should take based on network conditions, priority of service, and other factors. The Network Layer provides routing of frames among networks, subnet traffic control, frame fragmentation, logical-physical address mapping, and subnet usage accounting.

The SDN controller 112 can provide an abstract view of the overall network. The SDN controller 112 can provide an interface through which one or more network administrators can control underlying network systems, including, for example, one or more network switches and/or one or more routers. The SDN controller 112 can operate in accordance with a protocol such as OpenFlow or a proprietary protocol.

The resource orchestrator 114 can communicate with the inventory 118. The inventory 118 can maintain the status of overall available virtual resources. The inventory 118 can update the available virtual resources based on real-time reporting from the cloud infrastructure. The resource orchestrator 114 can communicate with the inventory 118 to determine the virtual resources available from the virtual resource layer 108 and can use this information in a decision regarding whether or not to request instantiation of one or more new virtual resources from the virtual resource layer 108.

The OSI L4-L7 service controller 116 can provide functionality for the creation of new network-based services and for the instantiation of network-based services in near realtime on a cloud infrastructure. The OSI L4-L7 service controller 116 can provide specific functionality for each service. The OSI L4-L7 service controller 116 can instantiate service logic and connectivity for new services. The OSI L4-L7 service controller 116 also can automatically scale service(s) and can automatically recover from service failures.

The OSI L4-L7 service controller 116 can enable rapid development and deployment of L4-L7 services in a cloud infrastructure. The OSI L4-L7 service controller 116 can provide operational benefits by automating recovery procedures so minimal manual intervention is required. The OSI L4-L7 service controller 116 also can provide the ability to use resources efficiently with real-time ability to grow or shrink a service based on demand.

The OSI L4-L7 service controller 116 can input a detailed service data model and specific business policies and/or engineering rules into a compiler to automatically create service templates for network-based services. Such functionality is not available today. Instead, services are typically developed from multiple sets of requirements and then integrated. Once integration and testing are complete, the service is deployed manually into each site. This site may be either a central office or a data center. The process is time consuming and error prone. Automating service creation, provisioning, scaling, and recovery will speed up service innovation and customer satisfaction.

The illustrated OSI L4-L7 service controller 116 includes a service compiler component 132, an orchestration and controller component 134, a policy and service management decision engine ("PSMDE") 136, a service data collection and analytics engine ("SDCAE") 138, one or more VNF controllers 140, and one or more VNF adapters 142. Each of the components is described in greater detail below.

The service compiler component 132 is a tool to specifically compile network-based services with service provider customizations. The service compiler component 132 can use as input compiler data 133 to create service templates for the network-based services. The compiler data 133 can include service data model files, business policies, engineering rules, recipes, dimensioning parameters, and configuration parameters. The compiler data 133 and additional details regarding the service compiler component 132 will be described below with reference to FIG. 2.

The service orchestration and controller component 134 can receive as input one or more service templates and can interface with the resource orchestrator 114 to instantiate one or more services that is/are defined, at least in part, by the template(s). The service template(s) can be generated by the service compiler component 132 and can be stored in a template database 144. Each template can contain details of a service, including, for example, service logic, business policies, engineering rules, installation recipes, dimensioning of virtual resources, and service configuration parameters. The other components of the OSI L4-L7 service controller 116 are used for service configuration, lifecycle management, auto-scaling, and auto-recovery.

To instantiate a service, a compiled service template is provided as input to the service orchestration and controller component 134. The service orchestration and controller component 134 analyzes the compiled service template to determine the computing, disk, memory, storage, and/or other resources to be utilized by the service. The service orchestration and controller component 134 also analyzes any business policies and/or engineering rules such as, for example, quality of service ("QoS") rules and affinity rules and determines how to instantiate the service. The service orchestration and controller component 134 can also use one or more recipes supplied as part of the compiled service template to request the resources via an OPENSTACK interface, or the like, from the resource orchestrator 114. The resource orchestrator 114 can instruct the cloud computing architecture 102 to instantiate one or more virtual machines ("VMs") with the requested vCPU, disk, memory, storage, and/or other resources. After the service orchestration and controller component 134 is notified that the virtual environment is ready, the service orchestration and controller component 134 can instruct the resource orchestrator 114 as to which VNF image to load onto which VM. The resource orchestrator 114 can update a VNF license database 146 with the license information for each VNF image used.

After the images are loaded, the service orchestration and controller component 134 can instruct the resource orchestrator 114 on the connectivity utilized by each VNF instance, or what may otherwise be referred to as stitching or chaining the VNFs as specified by the recipe provided by the service template. After the connectivity has been established, the service orchestration and controller component 134 can instruct the VNF controller(s) 140 to configure each VNF in accordance with the service template. After the aforementioned operations, the service is instantiated.

The VNF controller(s) 140 can collect data related to fault, capacity, accounting, performance, and security ("FCAPS-type data") from VNFs and can send the data to the SDCAE 138 via the VNF adapter(s) 142. The SDCAE 138 can correlate the data and can communicate the data to the PSMDE 136. The PSMDE 136 can utilize one or more policies and/or one or more rules and the data received from the SDCAE 138 to determine if the topology of the service should be modified. If the SDCAE 138 determines that the topology of the service should be modified, the SDCAE 138 can instruct the service orchestration and controller component 134 regarding the modification. By way of example and not limitation, the modification may include scaling the service to accommodate additional traffic or providing instructions to one or more components regarding how to recover from an application failure.

A service inventory and topology database 148 can store information regarding services that have been instantiated. For example, the service inventory and topology database 148 can store information such as the number of services, the type of services, the resources utilized by the services, the policies and/or rules the services have been instantiated in accordance with, and the like.

The illustrated provider systems 120 include a VNF catalog 156, a master service orchestrator 158, a customer portal 160, and one or more operations support systems ("OSS") and business support systems ("BSS") 162. The VNF catalog 156 can include a set of VNFs that can be used to create one or more services. The master service orchestrator 158 can orchestrate multiple services and interfaces with the OSI L4-L7 service controller 116 to orchestrate one or more L4-L7 services. The customer portal 160 can provide an interface to customers for operations such as requesting services, viewing reports, and the like. The OSS of the OSS/BSS 162 can manage the network and services and support management functions such as, for example, service assurance, capacity management, performance management, and the like. The BSS of the OSS/BSS 162 can run the business operations towards customers and support functions such as, for example, sales, ordering, and the like.

Figure 2:
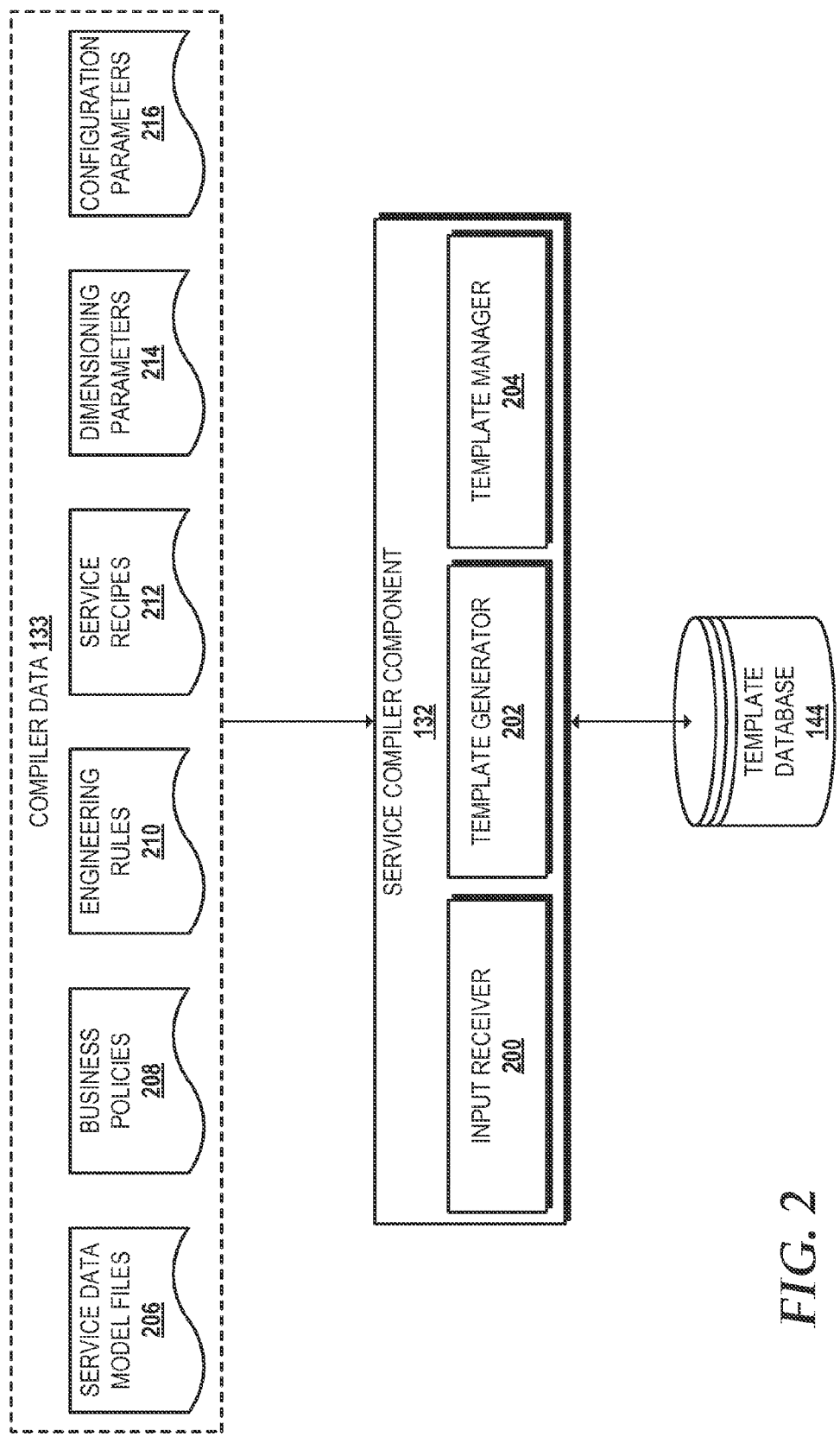
FIG. 2 is a block diagram illustrating aspects of a service compiler component, according to an illustrative embodiment.

Turning now to FIG. 2, a block diagram illustrating aspects of the service compiler component 132 will be described, according to an illustrative embodiment. The illustrated service compiler component 132 includes an input receiver 200, a template generator 202, and a template manager 204. The input receiver 200 can handle intake of the compiler data 133. The template generator 202 can analyze the compiler data 133 to generate one or more templates for one or more services. The template manager 204 can cause templates to be stored in the template database 144, can communicate with the template database 144 to retrieve previously stored templates, and can provide the templates to other components such as the service orchestration and controller component 134.

The illustrated compiler data 133 includes one or more service data model files 206, one or more business policies 208, one or more engineering rules 210, one or more service recipes 212, one or more dimensioning parameters 214, and one or more configuration parameters 216. The service data model file(s) 206 can include one or more pointers to one or more specific VNFs that are to be utilized by a service. The one or more business policies 208 and the one or more engineering rules 210 can define one or more constraints of a service related to, for example, quality of service ("QoS"), affinity rules, and/or security zones. For example, if the service includes a voice component, the appropriate QoS can be included so that the service template, when executed, will identify the appropriate resources to be allocated. The service recipe(s) 212 can define cloud platform independent scripts used for deployment, such as installing VNF software on a VM. The dimensioning parameters 214 can define the sizing of the service in terms of the virtual resources. The configuration parameters 216 can include service specific configurations established by a service provider.

The service compiler component 132 can accept multiple formats of files, including, but not limited to, domain specific language, YAML, CHEF scripts, and PUPPET scripts. The service compiler component 132 can generate a service template for each service provided by a service provider. The format of the service template can be configurable. Additionally, when the service template is executed by the service orchestration and controller component 134 (shown in FIG. 1), the service template may invoke other service templates that are available. The other service templates may be components of new services and are referred to herein as patterns.

The following example demonstrates how the service compiler component 132 can enable customization for a voice over long-term evolution ("VoLTE") service. For VoLTE, the QoS can indicate a specific class of infrastructure upon which the service provider should offer the service. In this example, the class of infrastructure can indicate that support for media be made available. This indication can enable the appropriate virtual resources to be allocated so that voice quality is preserved. Additionally, there are certain known annual days where call volumes are high and historical demand is known. This information can be defined in one or more of the business policies 208 that are provided as input to the service compiler component 132. The aforementioned data is only a subset of the data that the service compiler component 132 might utilize to create a customized VoLTE service.

The service compiler component 132 provides several benefits for a service provider. The service compiler component 132 provides the ability to apply service provider specific service configuration parameters (i.e., the configuration parameters 216) and to apply service provider specific business policies and engineering rules (i.e., the business policies 208 and the engineering rules 210). The service compiler component 132 enables rapid development and deployment of layer 4-7 services in a cloud computing infrastructure. The service compiler component 132 provides operational benefits by automating scaling and recovery procedures so minimal manual intervention is required. The service compiler component 132 provides the ability to use resources efficiently with real-time ability to grow or shrink a service based upon demand.

Figure 3:
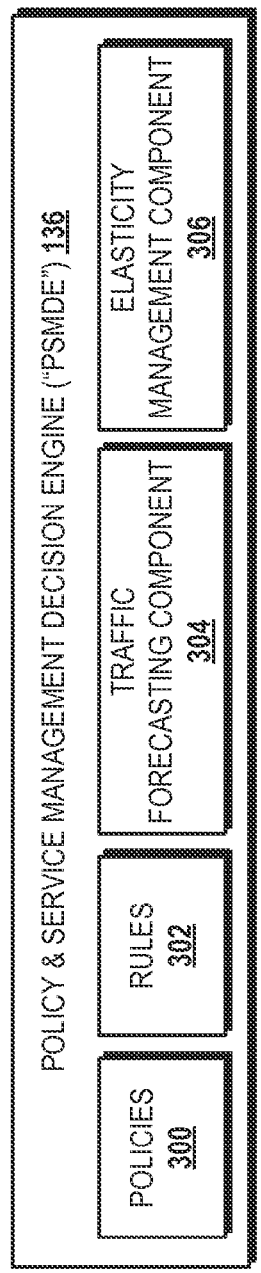
FIG. 3 is a block diagram illustrating aspects of a policy and service management decision engine ("PSMDE"), according to an illustrative embodiment.

Turning now to FIG. 3, is a block diagram illustrating aspects of the PSMDE 136 will be described, according to an illustrative embodiment. The PSMDE 136 can provide intelligent virtual resource and service monitoring. The PSMDE 136 also can provide service management functions for the OSI L4-L7 service controller 116. The illustrated PSMDE 136 includes one or more policies 300, one or more rules 302, a traffic forecasting component 304, and an elasticity management component 306.

The traffic forecasting component 304 can make scale-in and scale-out decisions based upon one or more of the policies 300 and/or one or more of the rules 302 that apply to data received from the SDCAE 138. For example, the traffic forecasting component 304 can receive a rate of incoming subscriber registrations to a monitored service, and the policies 300 can include a policy that defines a threshold rate of incoming subscriber registrations that can be utilized by the traffic forecasting component 304 to determine whether scale-in operations or scale-out operations should be performed. As used herein, a scale-in operation is defined as reducing or shrinking resources based on a reduction in load demand. As used herein, a scale-out operation is defined as growing resources based on a surge in load or demand.

The traffic forecasting component 304 can additionally or alternatively utilize one or more of the rules 302 for decisions regarding scale-in and scale-out. The rules 302 can include business rules. A business rule, for example, can include a time of day for a pre-determined event such as a mass calling voting event for an episode of a singing competition. Other business rules in addition to predicted schedule-based rules where inferences can be made about available capacity based upon a request queue length or number of active calls are contemplated. Such business rules are independent of processor utilization, but can provide predictive data for use by the traffic forecasting component 304.

The PSMDE 136 can use data received from the SDCAE 138 to perform predictive traffic forecasting via the traffic forecasting component 304. The PSMDE 136 can use automated proactive and reactive mechanisms to perform load adaptation operations for handling load changes experienced by virtual resources operating within the virtual resource layer 108. The elasticity management component 306 can trigger dynamic allocation of virtual resources based on the traffic predictions provided by the traffic forecasting component 304. The PSMDE 136 can provide manual controls to be used by personnel under emergency situations.

Figure 4:
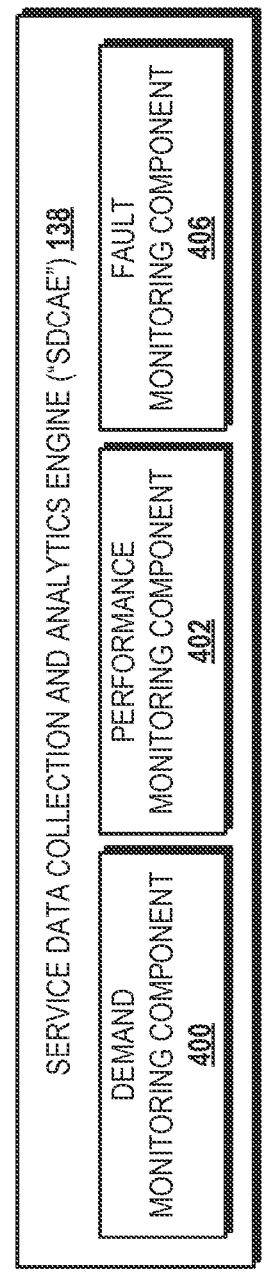
FIG. 4 is a block diagram illustrating aspects of a service data collection and analytics engine ("SDCAE"), according to an illustrative embodiment.

Turning now to FIG. 4, a block diagram illustrating aspects of the SDCAE 138 will be described, according to an illustrative embodiment. The illustrated SDCAE 138 includes a demand monitoring component 400, a performance monitoring component 402, and a fault monitoring component 406 (referred to herein collectively as "monitoring components 400-406"). The monitoring components 400-406 can provide data to the PSMDE 136. The PSMDE 136 can utilize the data to make decisions regarding network traffic forecasting.

The demand monitoring component 400 can provide service utilization data, including, for example, a number of concurrent service sessions, a number of active subscribers to a service, and any other data regarding the utilization of one or more resources, such as one or more of the VNFs 130, that provide, at least in part, a monitored service. The performance monitoring component 402 and the fault monitoring components 406 can operate at both the resource level (e.g., the virtual resource layer 108) and the service level.

The monitoring components 400-406 can receive alerts from the virtual resource layer 108 and can make queries to the virtual resource layer 108 via simple network management protocol ("SNMP") or another suitable protocol. The monitoring components 400-406 can query specific resources, such as one or more of the VNFs 130, and can receive, in response, data specific to the configuration of the queried resources. The data can be utilized to monitor, to track, and to trend the hardware resources utilized by the queried resource. The VMMs 128 can perform operations to provide capacity and utilization data in real-time for the hardware resources associated with the virtual resources operating within the virtual resource layer 108. The performance monitoring component 402 can monitor virtual resource performance at the service layer and can be based on the virtual resource container(s) in which a given service is running. The monitoring frequency can be configurable and can be tuned to meet performance constraints of network functions (e.g., monitoring too often may impact the performance of the network function) and timeframes appropriate for dynamic orchestration.

Figure 5:
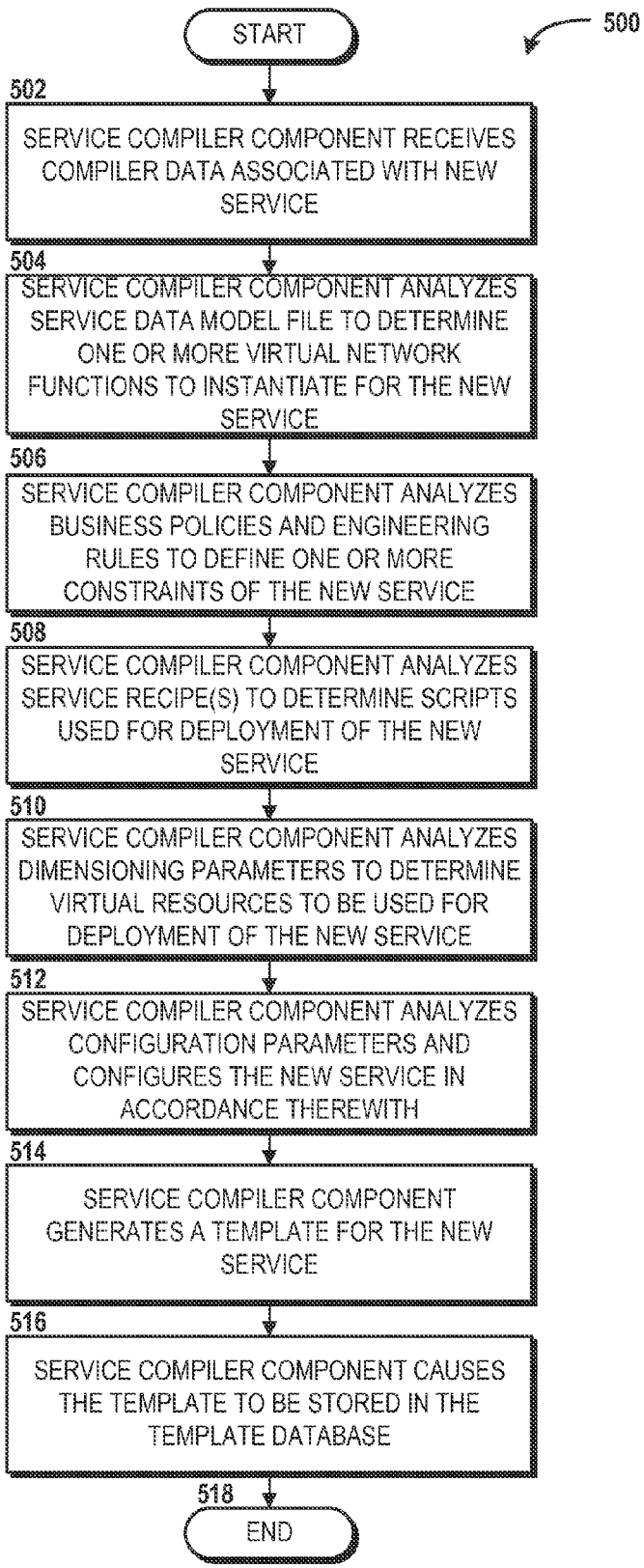
FIG. 5 is a flow diagram illustrating aspects of a method for analyzing compiler data and generating a service template for an Open Systems Interconnection ("OSI") communication model layers 4-7 service in a cloud computing system, according to an illustrative embodiment.

Turning now to FIG. 5, a flow diagram illustrating aspects of a method 500 for analyzing compiler data and generating a service template for an OSI communication model layers 4-7 service in a cloud computing system will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof can refer to causing a processor, such as, for example, one or more of the compute resources 122 of the hardware resource layer 104 to perform operations upon execution of one or more instructions. The instructions can be provided by the service compiler component 132, the service orchestration and controller component 134, the PSMDE 136, the SDCAE 138, the VNF controller(s) 140, the VNF adapter(s) 142, the resource orchestrator 114, the SDN controller 112, and/or one or more other computing systems, devices, engines, or components disclosed herein. As used herein, the phrase "cause a processor to perform operations" and variants thereof can refer to a processor of the service compiler component 132, a processor of the service orchestration and controller component 134, a processor of the PSMDE 136, a processor of the SDCAE 138, a processor of the VNF controller(s) 140, a processor of the VNF adapter(s) 142, a processor of the resource orchestrator 114, a processor of the SDN controller 112, and/or a processor one or more other computing systems, devices, engines, or components disclosed herein executing one or more instructions to perform operations. It should be understood that the performance of one or more operations may include operations executed by one or more virtual processors at the instruction of one or more of the aforementioned hardware processors.

The method 500 will be described with reference to FIG. 5 and further reference to FIGS. 1 and 2. The method 500 begins at operation 502, where the service compiler component 132 receives the compiler data 133. The compiler data 133 in this example is associated with a new service for which a service template is to be generated.

From operation 502, the method 500 proceeds to operation 504, where the service compiler component 132 analyzes one or more of the service data model files 206 to determine one or more VNFs that are to be instantiated for the new service. From operation 504, the method 500 proceeds to operation 506, where the service compiler component 132 analyzes one or more of the business policies 208 and/or one or more of the engineering rules 210 to define one or more constraints of the new service. The constraints can include, for example, QoS constraints, affinity rules, and/or security zones.

From operation 506, the method 500 proceeds to operation 508, where the service compiler component 132 analyzes one or more of the service recipes 212 to determine one or more scripts to be used for deployment of the new service. The service recipes 212 can define one or more cloud platform independent scripts to be used for deployment of the new service, such as, for example, installing VNF software on a VM. The service recipes 212 can be written in any scripting language, some examples of which include CHEF and PUPPET, although other scripting languages are contemplated.

From operation 508, the method 500 proceeds to operation 510, where the service compiler component 132 analyzes the dimensioning parameters 214 to determine one or more virtual resources to be used for deployment of the new service. From operation 510, the method 500 proceeds to operation 512, where the service compiler component 132 analyzes the configuration parameters 216 and configures the new service in accordance therewith. The configuration parameters 216 can be specific to a service provider and therefore can be utilized by the service provider to differentiate the new service from similar services offered by other service providers in the market.

From operation 512, the method 500 proceeds to operation 514, where the service compiler component 132 generates a template for the new service. From operation 514, the method 500 proceeds to operation 516, where the service compiler component 132 causes the template to be stored in the template database 144. The template can be retrieved by or provided to the orchestration and controller component 134, which can utilize the service template to instantiate the new service.

From operation 516, the method 500 proceeds to operation 518. The method 500 ends at operation 518.

Figure 6:
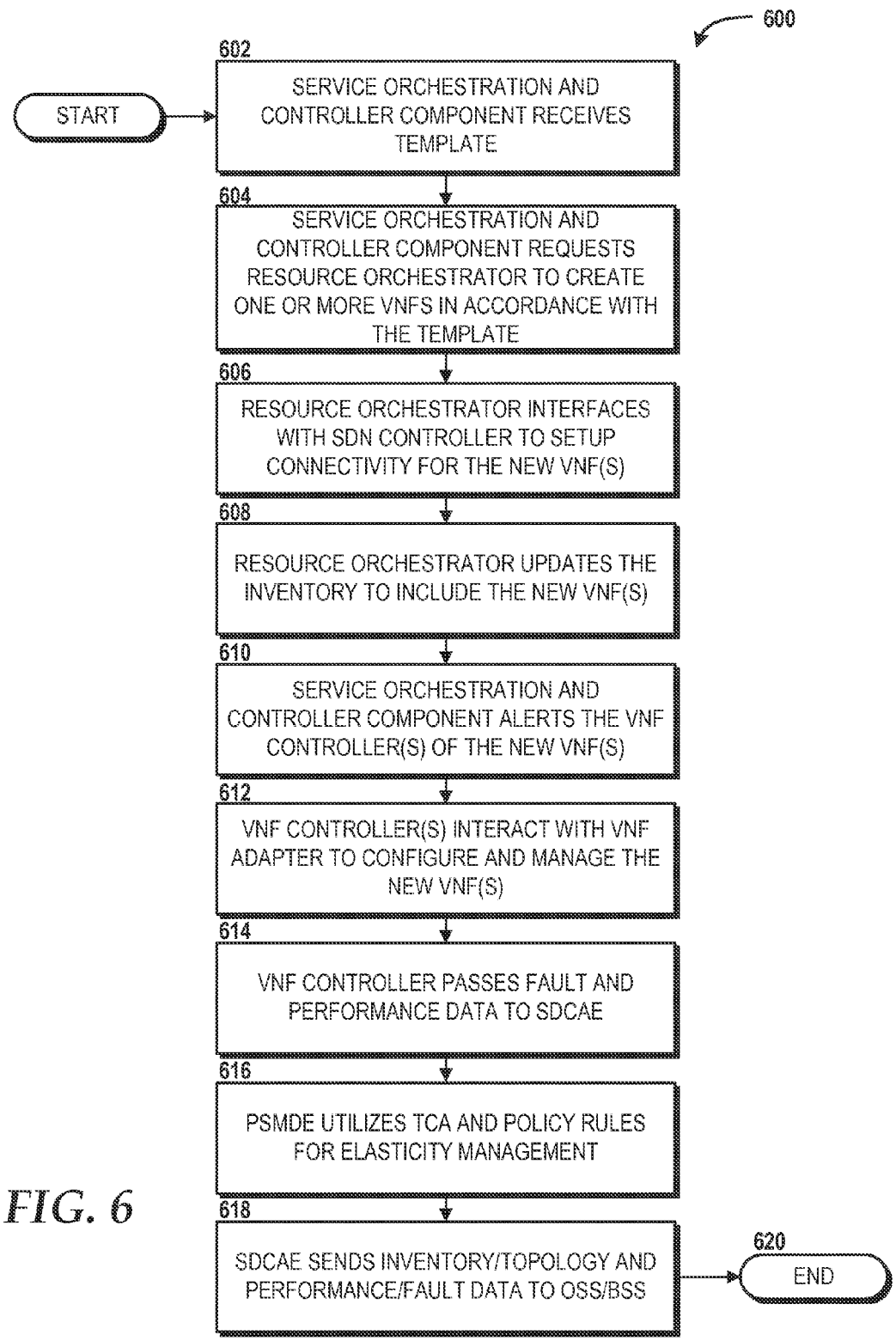
FIG. 6 is a flow diagram illustrating aspects of a method for operating a service controller to deploy an Open Systems Interconnection ("OSI") communication model layers 4-7 service in a cloud computing system, according to an illustrative embodiment.

Turning now to FIG. 6, a flow diagram illustrating aspects of a method 600 for operating the OSI L4-L7 service controller 116 to deploy an OSI communication model layer 4-7 service in a cloud computing system will be described, according to an illustrative embodiment. The method 600 will be described with reference to FIG. 6 and further reference to FIG. 1.

The method 600 begins and flow proceeds to operation 602, where the service orchestration and controller component 134 receives a template. The service orchestration and controller component 134 can request the template from the service compiler component 132 or from the template database 144 and can receive the template from the service compiler component 132 or the template database 144 in response to the request.

From operation 602, the method 600 proceeds to operation 604, where the service orchestration and controller component 134 requests the resource orchestrator 114 to create one or more of the VNFs 130 in accordance with the template. From operation 604, the method 600 proceeds to operation 606, where the resource orchestrator 114 interfaces with the SDN controller 112 to setup connectivity for the new VNF(s). From operation 606, the method 600 proceeds to operation 608, where the resource orchestrator 114 updates the inventory 118 to include the new VNF(s).

From operation 608, the method 600 proceeds to operation 610, where the service orchestration and controller component 134 alerts one or more of the VNF controllers 140 of the new VNF(s). From operation 610, the method 600 proceeds to operation 612, where the VNF controller(s) 140 interacts with one or more of the VNF adapters 142 to configure and manage the new VNF(s). From operation 612, the method 600 proceeds to operation 614, where the VNF controller(s) 140 pass fault and/or performance data to the SDCAE 138.

From operation 614, the method 600 proceeds to operation 616, where the PSMDE 136, and more particularly, the elasticity management component 306, utilizes one or more of the policies 300 and/or one or more of the rules 302 for elasticity management. From operation 616, the method 600 proceeds to operation 618, where the SDCAE 138 sends inventory and topology information and performance and fault data to the OSS/BSS 162.

From operation 616, the method 600 proceeds to operation 618. The method 600 ends at operation 618.

Figure 7:
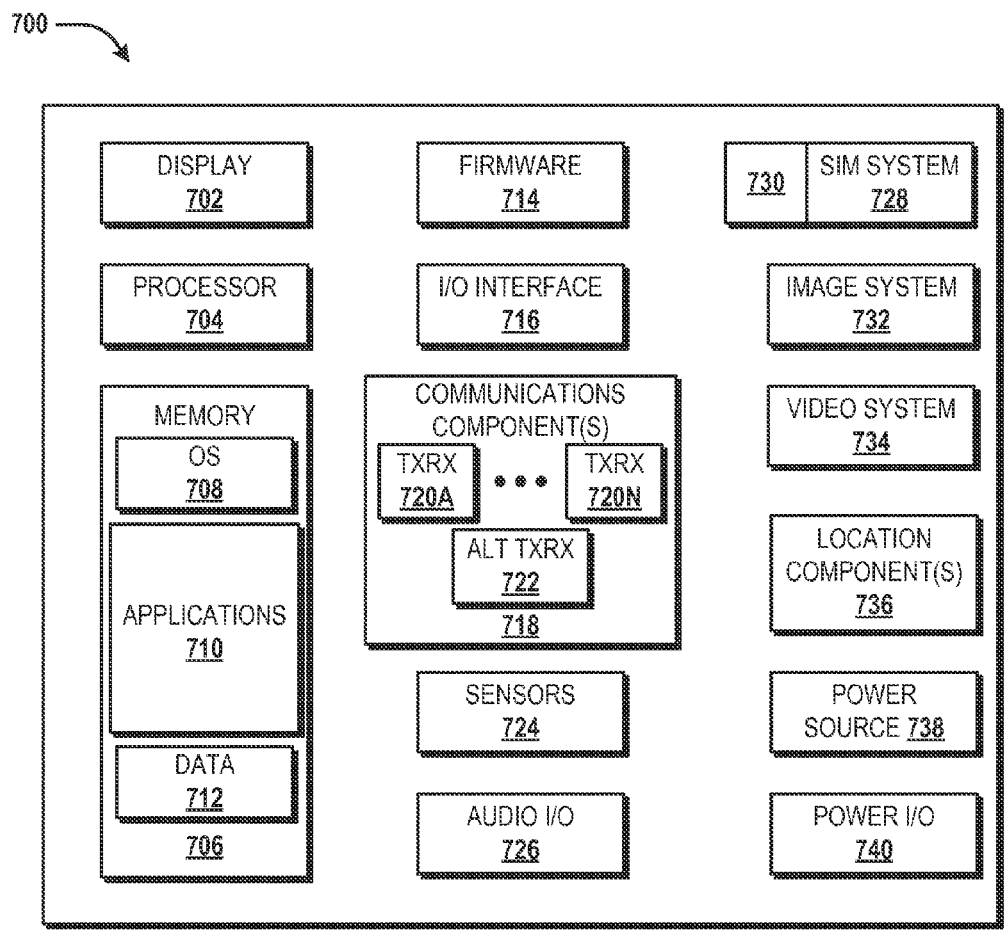
FIG. 7 is a block diagram illustrating an example mobile device capable of implementing aspects of the embodiments disclosed herein.

Turning now to FIG. 7, an illustrative mobile device 700 and components thereof will be described. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in a memory 706, or the like. In some embodiments, the applications 710 also can include a user interface ("UI") application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, one or more identifiers, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1344 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using Global System for Mobile communications ("GSM"), Code Division Multiple Access ("CDMA") ONE, CDMA2000, Long-Term Evolution ("LTE"), and various other 2G, 2.5G, 3G, 7G, and greater generation technology standards. Moreover, the communications component 718 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 718 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
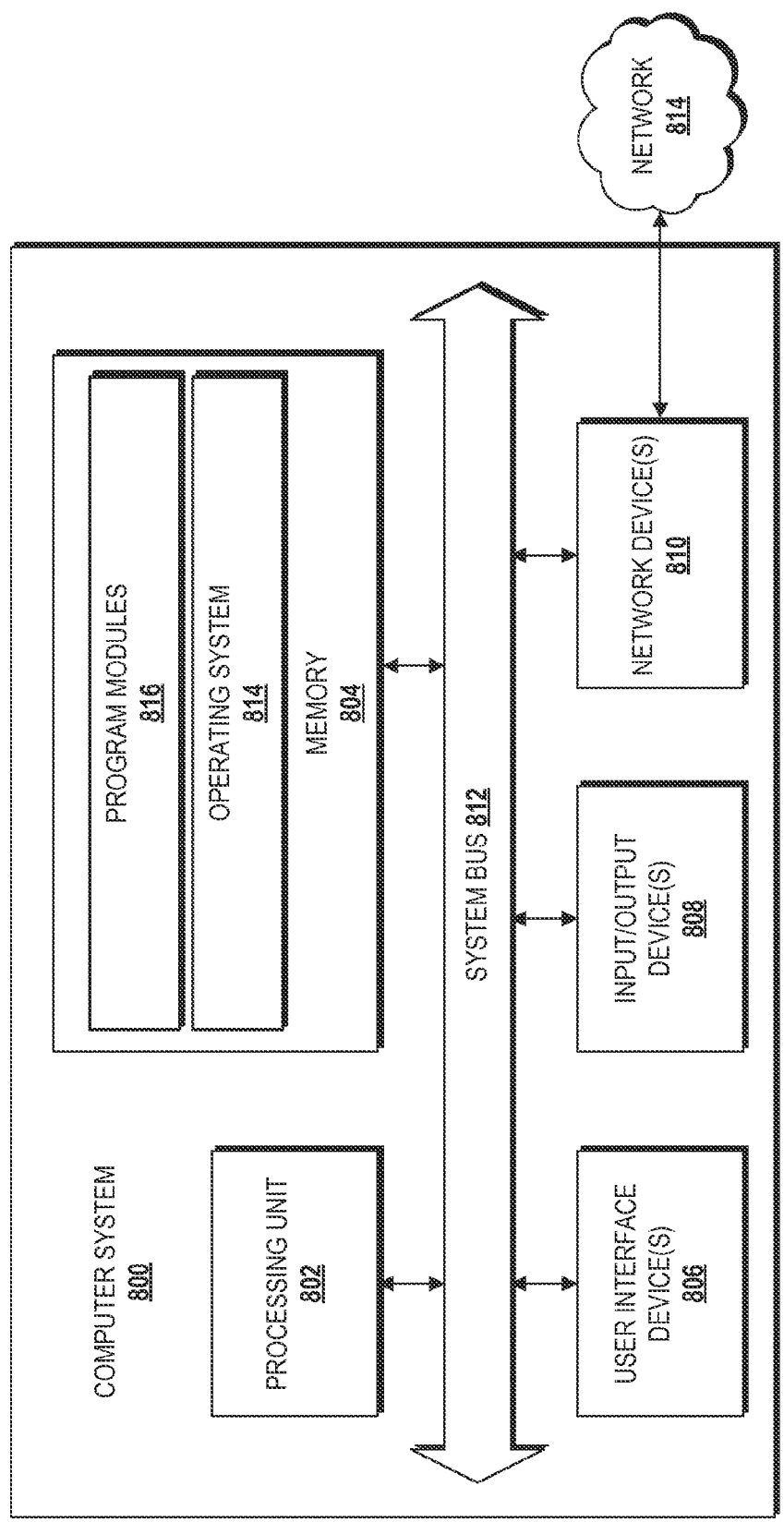
FIG. 8 is a block diagram illustrating an example computer system capable of implementing aspects of the embodiments presented herein.

Turning now to FIG. 8, a block diagram illustrating a computer system 800 configured to provide the functionality in accordance with various embodiments of the concepts and technologies disclosed herein will be described. In some implementations, the hardware resource layer 104 (illustrated in FIG. 1) includes one or more computers that are configured like the architecture of the computer system 800. The computer system 800 may provide at least a portion of the compute resource(s) 122, the memory resource(s) 124, and/or the other resources 126. Moreover, any of the elements shown in FIG. 1 may be executable on top of the computer system 800 or multiples thereof, or may together or separately include an architecture like the architecture of the computer system 800. It should be understood, however, that modification to the architecture may be made to facilitate certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resource(s) 122 (illustrated in FIG. 1) can include one or more processing units 802.

The memory 804 communicates with the processing unit 802 via the system bus 812. In some embodiments, the memory 804 is operatively connected to a memory controller (not shown) that enables communication with the processing unit 802 via the system bus 812. The memory resources 124 can include one or more instances of the memory 804. The illustrated memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. The program modules 816 and/or other programs can be embodied in computer-readable media containing instructions that, when executed by the processing unit 802, perform various operations such as those described herein. According to embodiments, the program modules 816 may be embodied in hardware, software, firmware, or any combination thereof. Although not shown in FIG. 8, it should be understood that the memory 804 also can be configured to store the template database 144.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, PDAs, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer. In some embodiments, the I/O devices 808 can be used for manual controls for operations to exercise under certain emergency situations.

The network devices 810 enable the computer system 800 to communicate with other networks or remote systems via a network 814. Examples of the network devices 810 include, but are not limited to, a modem, a radio frequency ("RF") or infrared ("IR") transceiver, a telephonic interface, a bridge, a router, or a network card. The network 814 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 814 may be a wired network such as, but not limited to, a Wide Area Network ("WAN"), a wired Personal Area Network ("PAN"), or a wired Metropolitan Area Network ("MAN"). The network 814 may be any other network described herein.

Figure 9:
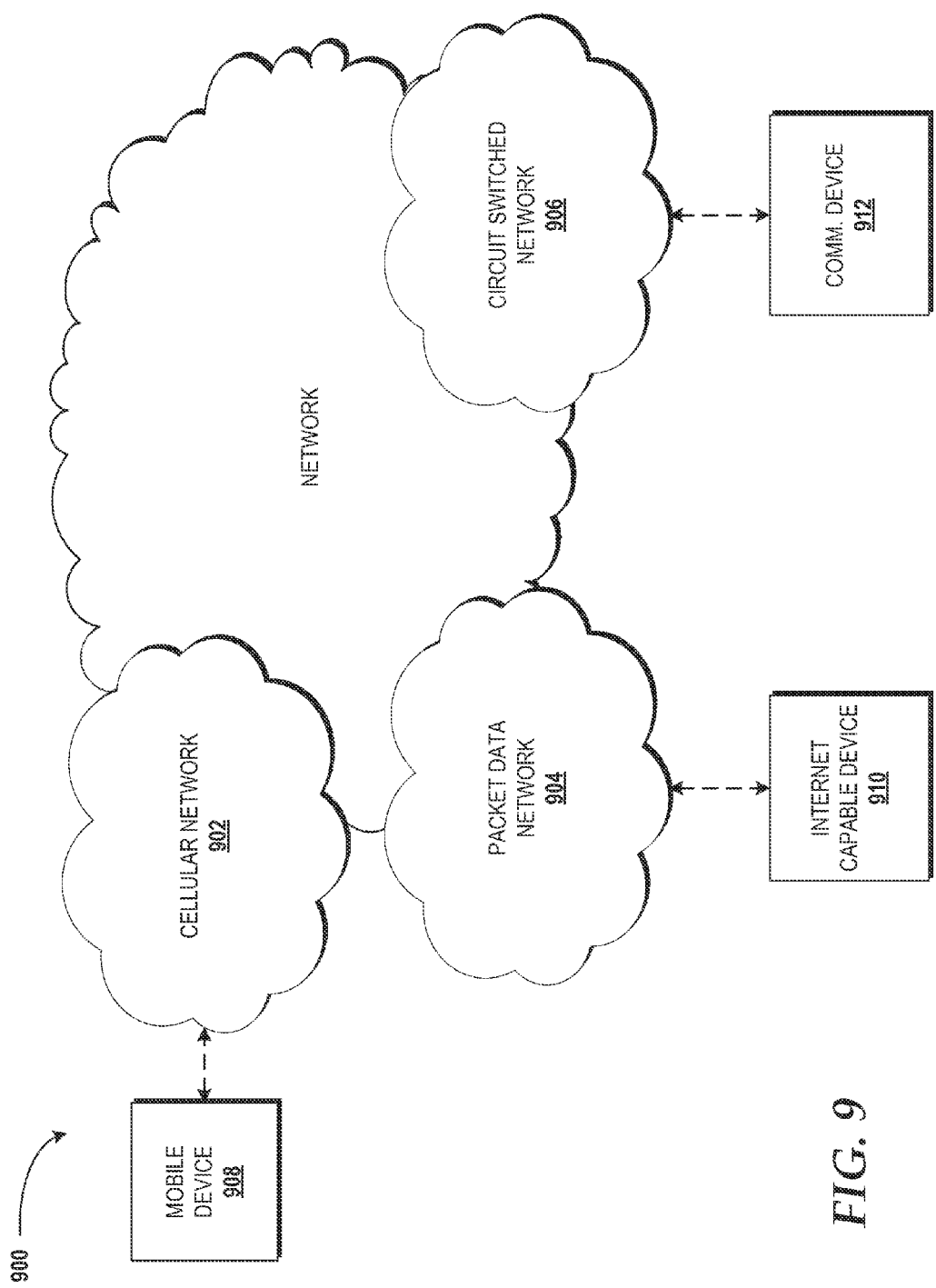
FIG. 9 is a diagram illustrating a network, according to an illustrative embodiment.

Turning now to FIG. 9, details of a network 900 are illustrated, according to an illustrative embodiment. The network 900 includes a cellular network 902, a packet data network 904, for example, the Internet, and a circuit switched network 906, for example, a PSTN. The cellular network 902 includes various components such as, but not limited to, base transceiver stations ("BTSs"), Node-B's or e-Node-B's, base station controllers ("BS Cs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 includes various devices, for example, servers, computers, databases, and other devices in communication with one another, as is generally known. The packet data network 904 can be or can include the cloud computing system 100 illustrated and described with reference to FIG. 1. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a POTS. The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network is used to refer broadly to any combination of the networks 902, 904, and 906. It should be appreciated that substantially all of the functionality described with reference to the network 900 can be performed by the cellular network 900, the packet data network 904, and/or the circuit switched network 906, alone or in combination with other networks, network elements, and the like.

Based on the foregoing, it should be appreciated that concepts and technologies directed to a service compiler and a service controller of OSI layer 4 through layer 7 services in a cloud computing system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. At least one memory resource that stores instructions that, when executed by a cloud computing system, cause the cloud computing system to perform operations comprising:

receiving compiler data associated with a new Open Systems Interconnection communication model layer 4 through layer 7 service provided by a service provider, the compiler data comprising a service data model file comprising a pointer to a virtual network function to be used to instantiate the new Open Systems Interconnection communication model layer 4 through layer 7 service, the compiler data further comprising at least one of a business policy associated with the new Open Systems Interconnection communication model layer 4 through layer 7 service and specific to the service provider or an engineering rule associated with the new Open Systems Interconnection communication model layer 4 through layer 7 service and specific to the service provider;

analyzing the compiler data at least to determine the virtual network function to be used to instantiate the new Open Systems Interconnection communication model layer 4 through layer 7 service and to determine a constraint of the new Open Systems Interconnection communication model layer 4 through layer 7 service based on at least one of the business policy specific to the service provider or the engineering rule specific to the service provider;

generating, based at least in part on analyzing the compiler data, a template for the new Open Systems Interconnection communication model layer 4 through layer 7 service, the template identifying the virtual network function to be used to instantiate the new Open Systems Interconnection communication model layer 4 through layer 7 service and further identifying how, based at least in part on the constraint of the new Open Systems Interconnection communication model layer 4 through layer 7 service, to instantiate the new Open Systems Interconnection communication model layer 4 through layer 7 service;

receiving the template for the new Open Systems Interconnection communication model layer 4 through layer 7 service;

requesting that a resource orchestrator create the virtual network function in accordance with the template;

alerting a virtual network function controller to the virtual network function created by the resource orchestrator; and interacting with a virtual network function adapter to configure and manage the virtual network function.

2. The at least one memory resource of claim 1, wherein analyzing the compiler data at least to determine the virtual network function to be used to instantiate the new Open Systems Interconnection communication model layer 4 through layer 7 service comprises analyzing the service data model file to determine the virtual network function to be used to instantiate the new Open Systems Interconnection communication model layer 4 through layer 7 service.

3. The at least one memory resource of claim 1, wherein the compiler data further comprises a service recipe, and wherein analyzing the compiler data further comprises analyzing the service recipe to determine a script that is used for deployment of the new Open Systems Interconnection communication model layer 4 through layer 7 service.

4. The at least one memory resource of claim 3, wherein the compiler data further comprises a configuration parameter, and wherein analyzing the compiler data further comprises analyzing the configuration parameter to determine how to configure the new Open Systems Interconnection communication model layer 4 through layer 7 service.

5. The at least one memory resource of claim 4, wherein the compiler data further comprises a dimensioning parameter, and wherein analyzing the compiler data further comprises analyzing the dimensioning parameter to determine a plurality of virtual resources to be utilized for deployment of the new Open Systems Interconnection communication model layer 4 through layer 7 service.

6. The at least one memory resource of claim 1, wherein the operations further comprise providing the template to an orchestration and controller component which utilizes the template to instantiate the new Open Systems Interconnection communication model layer 4 through layer 7 service.

7. A cloud computing system comprising:

a plurality of compute resources; and a plurality of memory resources comprising instructions for implementing a service controller comprising a service compiler component, an orchestration and controller component, and a virtual network function controller;

wherein the service compiler component, when executed by a first portion of the plurality of compute resources, causes the first portion of the plurality of compute resources to perform first operations comprising:

receiving compiler data associated with a new Open Systems Interconnection communication model layer 4 through layer 7 service provided by a service provider, the compiler data comprising a service data model file comprising a pointer to a virtual network function to be used to instantiate the new Open Systems Interconnection communication model layer 4 through layer 7 service, the compiler data further comprising at least one of a business policy associated with the new Open Systems Interconnection communication model layer 4 through layer 7 service and specific to the service provider or an engineering rule associated with the new Open Systems Interconnection communication model layer 4 through layer 7 service and specific to the service provider, analyzing the compiler data at least to determine the virtual network function to be used to instantiate the new Open Systems Interconnection communication model layer 4 through layer 7 service and to determine a constraint of the new Open Systems Interconnection communication model layer 4 through layer 7 service based on at least one of the business policy specific to the service provider or the engineering rule specific to the service provider, and generating, based at least in part on analyzing the compiler data, a template for the new Open Systems Interconnection communication model layer 4 through layer 7 service, the template identifying the virtual network function to be used to instantiate the new Open Systems Interconnection communication model layer 4 through layer 7 service and further identifying how, based at least in part on the constraint of the new Open Systems Interconnection communication model layer 4 through layer 7 service, to instantiate the new Open Systems Interconnection communication model layer 4 through layer 7 service;

wherein the orchestration and controller component, when executed by a second portion of the plurality of compute resources, causes the second portion of the plurality of compute resources to perform second operations comprising:
receiving the template for the new Open Systems Interconnection communication model layer 4 through layer 7 service,
requesting a resource orchestrator to create the virtual network function in accordance with the template, and
alerting the virtual network function controller to the virtual network function; and
wherein the virtual network function controller that, when executed by a third portion of the plurality of compute resources, performs third operations comprising interacting with a virtual network function adapter to configure and manage the virtual network function.

8. The cloud computing system of claim 7, wherein the compiler data further comprises a service recipe, a configuration parameter, and a dimensioning parameter, and wherein analyzing the compiler data at least to determine the virtual network function to be used to instantiate the new Open Systems Interconnection communication model layer 4 through layer 7 service comprises:
analyzing the service data model file to determine the virtual network function to be used to instantiate the new Open Systems Interconnection communication model layer 4 through layer 7 service;
analyzing the service recipe to determine a script that is used for deployment of the new Open Systems Interconnection communication model layer 4 through layer 7 service;
analyzing the configuration parameter to determine how to configure the new Open Systems Interconnection communication model layer 4 through layer 7 service; and
analyzing the dimensioning parameter to determine a plurality of virtual resources to be utilized for deployment of the new Open Systems Interconnection communication model layer 4 through layer 7 service.

9. The cloud computing system of claim 7, further comprising a policy management and service management decision engine that, when executed by at least one of a plurality of hardware resources, performs operations associated with traffic forecasting and elasticity management.

10. The cloud computing system of claim 9, wherein the third operations further comprise:
collecting data related to at least one of fault, capacity, accounting, performance, or security from the virtual network function; and
sending the data to a service data collection and analytics engine.

11. The cloud computing system of claim 10, wherein the service data collection and analytics engine that, when executed by a fourth portion of the plurality of compute resources, performs fourth operations comprising:
correlating the data; and
communicating the data to the policy management and service management decision engine.

12. The cloud computing system of claim 11, wherein the policy management and service management decision engine that, when executed by a fifth portion of the plurality of compute resources, performs fifth operations comprising:
utilizing at least one policy and the data received from the service data collection and analytics engine to determine if a topology of the new Open Systems Interconnection communication model layer 4 through layer 7 service should be modified; and
in response to determining the topology of the new Open Systems Interconnection communication model layer 4 through layer 7 service should be modified, instructing the orchestration and controller component regarding a modification to the new Open Systems Interconnection communication model layer 4 through layer 7 service.

13. A method comprising:
receiving, by a first portion of a plurality of hardware resources that executes a service compiler component of a service controller, compiler data associated with a new Open Systems Interconnection communication model layer 4 through layer 7 service provided by a service provider, the compiler data comprising a service data model file comprising a pointer to a virtual network function to be used to instantiate the new Open Systems Interconnection communication model layer 4 through layer 7 service, the compiler data further comprising at least one of a business policy associated with the new Open Systems Interconnection communication model layer 4 through layer 7 service and specific to the service provider or an engineering rule associated with the new Open Systems Interconnection communication model layer 4 through layer 7 service and specific to the service provider;
analyzing, by the first portion of the plurality of hardware resources that executes the service compiler component of the service controller, the compiler data at least to determine the virtual network function to be used to instantiate the new Open Systems Interconnection communication model layer 4 through layer 7 service and to determine a constraint of the new Open Systems Interconnection communication model layer 4 through layer 7 service based on at least one of the business policy specific to the service provider or the engineering rule specific to the service provider;
generating, by the first portion of the plurality of hardware resources that executes the service compiler component of the service controller, based at least in part on analyzing the compiler data, a template for the new Open Systems Interconnection communication model layer 4 through layer 7 service, the template identifying the virtual network function to be used to instantiate the new Open Systems Interconnection communication model layer 4 through layer 7 service and further identifying how, based at least in part on the constraint of the new Open Systems Interconnection communication model layer 4 through layer 7 service, to instantiate the new Open Systems Interconnection communication model layer 4 through layer 7 service;

receiving, by a second portion of the plurality of hardware resources that executes an orchestration and controller component of the service controller, the template for the new Open Systems Interconnection communication model layer 4 through layer 7 service;

requesting, by the second portion of the plurality of hardware resources that executes the orchestration and controller component of the service controller, that a resource orchestrator create the virtual network function in accordance with the template;

alerting, by the second portion of the plurality of hardware resources that executes the orchestration and controller component of the service controller, a virtual network function controller to the virtual network function created by the resource orchestrator; and interacting, by a third portion of the plurality of hardware resources that executes the virtual network function controller, with a virtual network function adapter to configure and manage the virtual network function.

14. The method of claim 13, wherein the compiler data further comprises a service recipe, a configuration parameter, and a dimensioning parameter, and wherein analyzing the compiler data at least to determine the virtual network function to be used to instantiate the new Open Systems Interconnection communication model layer 4 through layer 7 service comprises:

analyzing the service data model file to determine the virtual network function to be used to instantiate the new Open Systems Interconnection communication model layer 4 through layer 7 service;

analyzing the service recipe to determine a script that is used for deployment of the new Open Systems Interconnection communication model layer 4 through layer 7 service;

analyzing the configuration parameter to determine how to configure the new Open Systems Interconnection communication model layer 4 through layer 7 service; and analyzing the dimensioning parameter to determine a plurality of virtual resources to be utilized for deployment of the new Open Systems Interconnection communication model layer 4 through layer 7 service.

15. The method of claim 13, further comprising:

collecting, by the third portion of the plurality of hardware resources that executes the virtual network function controller, data related to at least one of fault, capacity, accounting, performance, or security from the virtual network function; and sending the data to a service data collection and analytics engine.

16. The method of claim 15, further comprising:

correlating, by a fourth portion of the plurality of hardware resources that executes the service data collection and analytics engine, the data; and communicating, by the fourth portion of the plurality of hardware resources that executes the service data collection and analytics engine, the data to a policy management and service management decision engine.

17. The method of claim 16, further comprising:

utilizing, by a fifth portion of the plurality of hardware resources that executes the policy management and service management decision engine, at least one policy and the data received from the service data collection and analytics engine to determine if a topology of the new Open Systems Interconnection communication model layer 4 through layer 7 service should be modified; and in response to determining the topology of the new Open Systems Interconnection communication model layer 4 through layer 7 service should be modified, instructing the orchestration and controller component regarding a modification to the new Open Systems Interconnection communication model layer 4 through layer 7 service.

18. The method of claim 17, further comprising performing, by the fifth portion of the plurality of hardware resources that executes the policy management and service management decision engine, operations associated with traffic forecasting and elasticity management.

\* \* \* \* \*